United States Patent
Chen

(10) Patent No.: US 10,574,882 B2
(45) Date of Patent: Feb. 25, 2020

(54) IMAGE CAPTURING APPARATUS, STORAGE SPACE ADJUSTING METHOD THEREOF AND NON-TRANSITORY COMPUTER-READABLE RECORDING MEDIUM

(71) Applicant: Wistron Corporation, New Taipei (TW)

(72) Inventor: Ling Chen, New Taipei (TW)

(73) Assignee: Wistron Corporation, New Taipei (TW)

(*) Notice: Subject to any disclaimer, the term of this patent is extended or adjusted under 35 U.S.C. 154(b) by 36 days.

(21) Appl. No.: 15/993,611

(22) Filed: May 31, 2018

(65) Prior Publication Data

US 2019/0215452 A1    Jul. 11, 2019

(30) Foreign Application Priority Data

Jan. 9, 2018 (CN) .......................... 2018 1 0019873

(51) Int. Cl.
*H04N 5/232* (2006.01)
*H04N 5/907* (2006.01)
(Continued)

(52) U.S. Cl.
CPC ..... *H04N 5/23222* (2013.01); *H04N 5/23229* (2013.01); *H04N 5/4403* (2013.01);
(Continued)

(58) Field of Classification Search
CPC .......... H04N 5/23222; H04N 5/23229; H04N 5/907; H04N 21/4335; H04N 2005/4412;
(Continued)

(56) References Cited

U.S. PATENT DOCUMENTS

| 6,111,605 A * | 8/2000 | Suzuki | H04N 5/225 348/220 |
| 6,774,472 B2 * | 8/2004 | Tsutsui | H04N 5/222 348/333.05 |

(Continued)

FOREIGN PATENT DOCUMENTS

CN    1437196    8/2003

OTHER PUBLICATIONS

Office Action of Taiwan Counterpart Application, dated Sep 7, 2018, pp. 1-6.

*Primary Examiner* — Marly S Camargo
(74) *Attorney, Agent, or Firm* — JCIPRNET

(57) ABSTRACT

An image capturing apparatus, a storage space adjusting method thereof and a non-transitory computer-readable recording medium are provided. In the method, during an image capturing operation of the image capturing apparatus, a size of a storage space of the image capturing apparatus is detected. In response to the storage space being insufficient, a space adjusting option for an adjusting operation on the storage space is presented through a display screen. Then, in response to a selecting operation on the space adjusting option, a process of the image capturing operation is maintained. The image capturing operation and programs related to an adjusting operation on the storage space are presented simultaneously by a picture-in-picture mode or a spit screen mode. Accordingly, because shooting or recording operations currently in process will not be suddenly interrupted, use experience may be improved.

20 Claims, 10 Drawing Sheets

(51) Int. Cl.
  *H04N 5/44* (2011.01)
  *H04N 5/77* (2006.01)
  *H04N 21/43* (2011.01)
  *G06F 16/17* (2019.01)
  *G06F 16/16* (2019.01)
  *H04N 21/4335* (2011.01)

(52) U.S. Cl.
  CPC ............. *H04N 5/772* (2013.01); *H04N 5/907* (2013.01); *H04N 21/4335* (2013.01); *H04N 2005/4412* (2013.01)

(58) Field of Classification Search
  CPC .. H04N 5/4403; H04N 7/772; G06T 16/1727; G06F 16/16
  USPC ....... 348/231.99, 231.1, 231.2, 231.3, 231.4, 348/231.5, 231.9; 386/247, 267, 272, 386/235, 231, 249, 282, 291; 715/700, 715/783, 763, 762, 800, 810, 815, 845, 715/858
  See application file for complete search history.

(56) References Cited

U.S. PATENT DOCUMENTS

| | | | |
|---|---|---|---|
| 9,886,188 B2* | 2/2018 | Saito | G06F 3/0485 715/769 |
| 2001/0050875 A1* | 12/2001 | Kahn | G11C 5/00 365/229 |
| 2003/0152359 A1 | 8/2003 | Kim | |
| 2008/0022218 A1* | 1/2008 | Cai | G06T 1/60 715/838 |
| 2014/0104319 A1* | 4/2014 | Shimomura | G06T 3/40 345/667 |
| 2014/0192228 A1* | 7/2014 | Lee | H04N 5/23229 348/201.4 |

\* cited by examiner

IMAGE CAPTURING APPARATUS, STORAGE SPACE ADJUSTING METHOD THEREOF AND NON-TRANSITORY COMPUTER-READABLE RECORDING MEDIUM

CROSS-REFERENCE TO RELATED APPLICATION

This application claims the priority benefit of China application serial no. 201810019873.5, filed on Jan. 9, 2018. The entirety of the above-mentioned patent application is hereby incorporated by reference herein and made a part of this specification.

BACKGROUND OF THE DISCLOSURE

1. Field of the Disclosure

The disclosure relates to an image capturing control, and more particularly, to an image capturing apparatus, a storage space adjusting method thereof and a non-transitory computer-readable recording medium.

2. Description of Related Art

With the rapid development of science and technology nowadays, image capturing functions such as photo shooting and video recording have already become the standard functions for mobile phones. In order to improve image quality, record video in slow motion or capture panorama photo, a size of video or photo can exceed tens of megabyte (MB). Naturally, other than storing video and photo, the mobile phones may also be stored with large files such as games, offline maps and the like. Therefore, users may often encounter a situation where a storage space is insufficient.

Yet, for the existing shooting program, if the situation where the storage space is insufficient does occur during video recording, the shooting program will be forced to stop. This sudden interruption during video recording can lead to poor experience for users. Thus, there is still room for improvement in the conventional technology.

SUMMARY OF THE DISCLOSURE

Accordingly, the disclosure is directed to an image capturing apparatus, a storage space adjusting method thereof and a non-transitory computer-readable recording medium, which are capable of maintaining a process of a shooting program when the storage space is insufficient.

The storage space adjusting method of the disclosure is adapted to an image capturing apparatus having a display screen. The storage space adjusting method includes the following steps. During an image capturing operation of the image capturing apparatus, a size of a storage space of the image capturing apparatus is detected. In response to the storage space being insufficient, a space adjusting option for an adjusting operation on the storage space is presented through a display screen. In response to a selecting operation on the space adjusting option, a process of the image capturing operation is maintained.

In an embodiment of the disclosure, the step in which the process of the image capturing operation is maintained in response to the selecting operation of the space adjusting option includes the following steps. If the selecting operation is related to adjusting on the storage space, a first screen related to the image capturing operation and a second screen related to the adjusting operation are simultaneously presented through the display screen. If the selecting operation is related to not adjusting on the storage space, the image capturing operation is ended when the storage space runs out.

In an embodiment of the disclosure, the step in which the first screen related to the image capturing operation is presented includes the following step. A full screen for presenting the image capturing operation is scaled down to a size of the first screen.

In an embodiment of the disclosure, the step in which the first screen related to the image capturing operation and the second screen related to the adjusting operation are simultaneously presented through the display screen includes the following step. The first screen and the second screen are presented by a split screen mode.

In an embodiment of the disclosure, the step in which the first screen related to the image capturing operation and the second screen related to the adjusting operation are simultaneously presented through the display screen includes the following step. The first screen and the second screen are presented by a picture-in-picture mode.

In an embodiment of the disclosure, the step in which the second screen related to the adjusting operation on the storage space is presented includes the following step. A software management program, a photo album program or a combination thereof is started on the second screen.

In an embodiment of the disclosure, the step in which the software management program, the photo album program or the combination thereof is started on the second screen includes the following step. In response to the software management program or the photo album program being closed, a screen of a desktop launcher program is presented on the second screen or the first screen is presented by a full screen.

In an embodiment of the disclosure, after the step in which the first screen related to the image capturing operation and the second screen related to the adjusting operation are simultaneously presented through the display screen, the storage space adjusting method further includes the following step. In response to the selecting operation on the first screen or the second screen, a window adjusting option is presented on a selected screen corresponding to the selecting operation for adjusting the selected screen. The window adjusting option includes options for minimizing window, maximizing window and closing window.

In an embodiment of the disclosure, after the step in which the first screen related to the image capturing operation and the second screen related to the adjusting operation are simultaneously presented through the display screen, the storage space adjusting method further includes the following steps. An operation button is presented on the first screen. In response to a dragging operation on the operation button, the first screen is correspondingly dragged.

In an embodiment of the disclosure, the step in which the size of the storage space of the image capturing apparatus is detected includes the following step. A remaining space or a space available for recording a video with a specific time length is used as a reference for determining the storage space being insufficient.

The image capturing apparatus of the disclosure includes an image capturing apparatus, a memory, a display screen and a processor. The image capturing unit captures at least one image. The memory has a store space for storing the at least one image. The display screen presents at least one screen. The processor is coupled to the image capturing unit, the memory and the display screen. During an image capturing operation of the image capturing unit, the processor detects a size of the storage space. In response to the storage space being insufficient, the processor presents a space adjusting option for an adjusting operation on the storage space through a display screen. In addition, the processor maintains a process of the image capturing operation in response to a selecting operation of the space adjusting option.

In an embodiment of the disclosure, if the selecting operation is related to adjusting on the storage space, the processor simultaneously presents a first screen related to the image capturing operation and a second screen related to the adjusting operation through the display screen. If the selecting operation is related to not adjusting on the storage space, the processor ends the image capturing operation when the storage space runs out.

In an embodiment of the disclosure, the processor scales down a full screen for presenting the image capturing operation to a size of the first screen through the display screen.

In an embodiment of the disclosure, the processor presents the first screen and the second screen by a split screen mode through the display screen.

In an embodiment of the disclosure, the processor presents the first screen and the second screen by a picture-in-picture mode through the display screen.

In an embodiment of the disclosure, the processor starts a software management program, a photo album program or a combination thereof on the second screen.

In an embodiment of the disclosure, the processor presents a screen of a desktop launcher program on the second screen or presents the first screen by a full screen through the display screen in response to the software management program or the photo album program being closed.

In an embodiment of the disclosure, the processor presents a window adjusting option on a selected screen corresponding to the selecting operation for adjusting the selected screen through the display screen in response to the selecting operation on the first screen or the second screen. The window adjusting option includes options for minimizing window, maximizing window and closing window.

In an embodiment of the disclosure, the processor presents an operation button on the first screen through the display screen. In response to a dragging operation on the operation button, the first screen is correspondingly dragged.

On the other hand, the non-transitory computer-readable recording medium of the disclosure records a program code, which is configured to be loaded by a processor of an image capturing apparatus to execute the follow steps. During an image capturing operation of the image capturing apparatus, a size of a storage space of the image capturing apparatus is detected. In response to the storage space being insufficient, a space adjusting option for an adjusting operation on the storage space is presented through a display screen. In response to a selecting operation on the space adjusting option, a process of the image capturing operation is maintained.

Based on the above, according to the embodiments of the disclosure, if the situation where the storage space is being encountered, the image capturing operation is presented on the first screen for maintaining the process, and the second screen is additionally provided for the user to delete video, photo or software. Both of the two screens may be adjusted in terms of size, dragged or closed. As a result, the user may simultaneously use the image capturing functions and delete files without having abnormal interruption during video recording or photo shooting.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
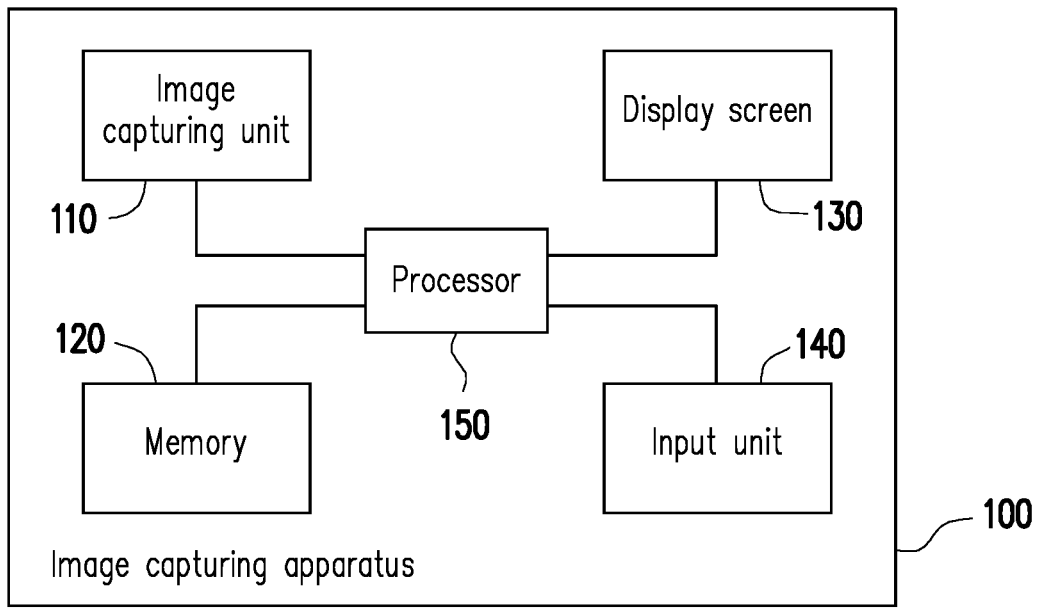
FIG. 1 is a block diagram illustrating devices in an image capturing apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram illustrating devices in an image capturing apparatus 100 according to an embodiment of the disclosure. With reference to FIG. 1, the image capturing apparatus 100 may be an electronic apparatus with image capturing functions (e.g., shooting, recording, etc.), such as a smart hone, a tablet computer, a notebook computer, a camera, a camcorder. The image capturing apparatus 100 at least includes, but not limited to, an image capturing unit 110, a memory 120, a display screen 130, an input unit 140 and a processor 150.

The image capturing unit 110 may be configured to capture images ahead and may include an image capturing lens having one lens or a set of lenses and a photosensitive sensor. The photosensitive sensor is configured to sense an intensity of light ray entering the lens in order to generate an image. The photosensitive sensor may be, for example, a charge coupled device (CCD), a complementary metal-oxide semiconductor (CMOS) device or other devices, which are particularly limited by the disclosure.

The memory 120 may be a fixed or a movable device in any possible forms including a random access memory (RAM), a read-only memory (ROM), a flash memory or other similar devices, or a combination of the above-mentioned devices. The memory 120 has a storage space (e.g., 32, 64, 128 Gigabyte (GB)) for storing photos or videos captured by the image capturing unit 110, program codes, device configuration, and buffered or permanent data.

The display screen 130 may be various displays for presenting screens, such as a liquid crystal display (LCD), an organic light emitting diode (OLED) display, etc.

The input unit 140 may be various devices or peripherals, such as a touch panel, a key, a button, a keyboard, a mouse or a track ball, for receiving user operations.

The processor 150 is connected to the image capturing unit 110, the memory 120, the display screen 130 and the input unit 140, and may be a central processing unit (CPU) or other programmable microprocessors for general purpose or special purpose, a digital signal processor (DSP), a programmable controller, an application specific integrated circuit (ASIC) or other similar devices or a combination of above-mentioned devices. In the embodiments of the disclosure, the processor 150 is configured to execute all the operations of the image capturing apparatus 100, and is capable of accessing data, files and information stored by the memory 120.

Figure 2:
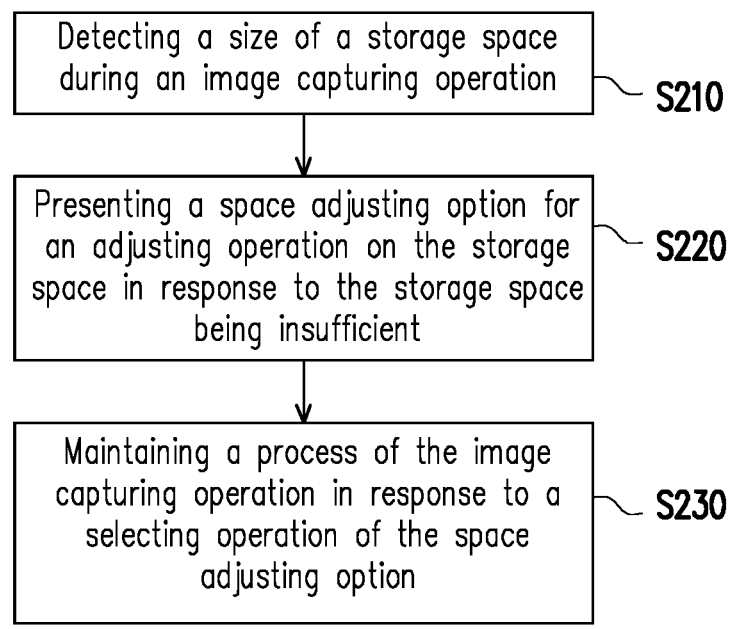
FIG. 2 is a flowchart illustrating a storage space adjusting method according to an embodiment of the disclosure.

For better understanding of operation process of the disclosure, detailed description is provided below with reference to various embodiments. FIG. 2 is a flowchart illustrating a storage space adjusting method according to an embodiment of the disclosure. With reference to FIG. 2, the method according to the embodiments of the disclosure is described below with reference to various devices and modules in the image capturing apparatus 100. Various steps of the method can be adjusted according to actual implementation situations, but not limited thereto.

During an image capturing operation of the image capturing unit 110, the processor 150 detects a size of the storage space (step S210). Specifically, the processor 150 first starts programs (e.g., a shooting program, a recording program, etc.) related to the image capturing operation (e.g., for shooting one single photo, panorama photos or continuous images, or recording video, etc.). During the process of photo shooting or video recording, the processor 150 detects a remaining storage space or detects abnormal or interrupted event notifications regarding the storage space being insufficient by ways of polling automatically (e.g., as triggered at a predetermined time) or in response to the user operations. As long as the shooting program or the recording program is still running (operating in foreground and/or background), the processor 150 continuously detects the storage space.

In response to the storage space of the memory 120 being insufficient, the processor 150 presents a space adjusting option for an adjusting operation on the storage space through the display screen 130 (step S220). Specifically, the processor 150 uses a remaining space or a space available for recording a video with a specific time length as a reference for determining the storage space being insufficient. If the remaining space of the storage space is less than a specific volume (e.g., 250 MB, 500 MB, etc.) or a volume of the video with the specific time length (e.g., 2, 5 minutes, etc.), the processor 150 determines that the storage space of the memory 120 is insufficient; otherwise, the processor 150 determines that the storage space is still sufficient. It should be noted that, the image capturing operation will be interrupted when the storage space is insufficient in the conventional technology. In the embodiments of the disclosure, to maintain the image capturing operation in process, the display screen 130 presents the space adjusting option on the current screen to ask in advance about whether the user needs to adjust the storage space (e.g., by deleting files, uninstalling software, etc.). The space adjusting option may be options specifically designed for the storage space of the memory 120, which are used to confirm whether to free the space, whether to delete temporary files, or whether to start a photo album program, a file management program or a software management program.

Figure 3B:
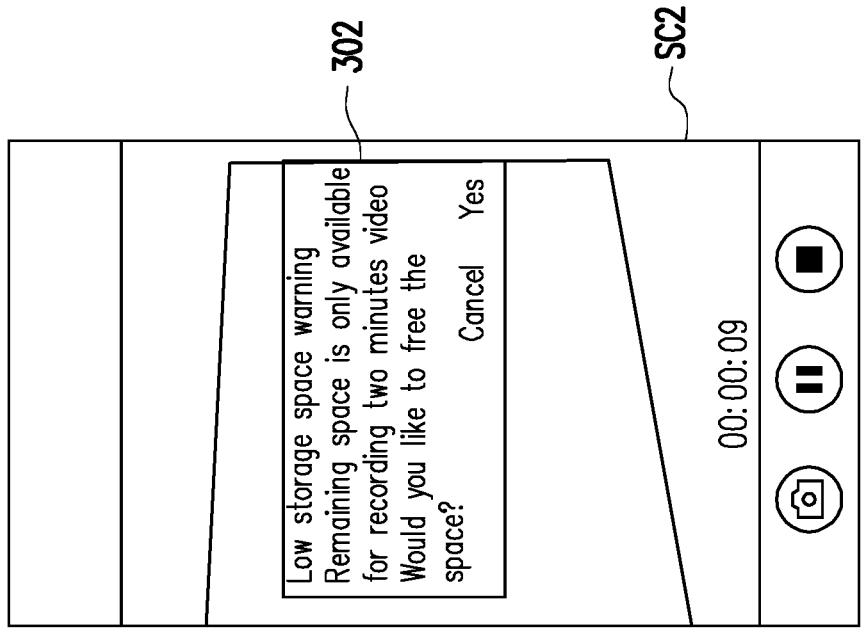
FIG. 3A and FIG. 3B are examples illustrating a screen of a space adjusting option.
Figure 3A:
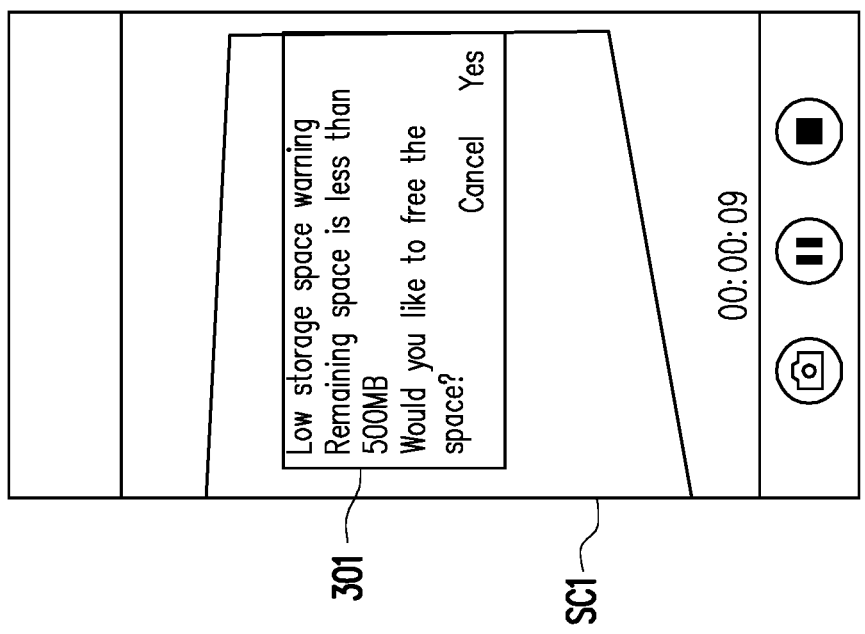

For instance, FIGS. 3A and 3B are two examples of the space adjusting option, in which screens SC1 and SC2 present instant preview images captured by the shooting program through the image capturing unit 110. The screen SC1 includes a warning prompt 301 which indicates that the remaining space is less than 500 MB, and the screen SC2 includes a warning prompt 302 which indicates that the storage space is only available for recording a video with a time length of 2 minutes. Each of the warning prompts 301 and 302 presents the space adjusting option for confirming whether to free the space. It should be noted that, the space adjusting option in the embodiments of the disclosure is not limited only to be presented by the warning prompt in the drawing. In other embodiments, the space adjusting option may also provide the prompt by ways of a notice bar, an indicating light or a warning tone, which may be adjusted depending on requirements of the user.

Next, the processor 150 maintains a process of the image capturing operation in response to a selecting operation of the space adjusting option (step S230). Specifically, through the input unit 140, the processor 150 receives the selecting operation of the user (which may be a tapping operation on a specific position on the touch panel, a button being pressed, or a right-click operation of the mouse, depending on the type of the input unit 140). If the selecting operation is related to adjusting on the storage space (e.g., for confirming whether to free the space, delete temporary files, or start the photo album program, etc), the processor 150 simultaneously presents the first screen related to the image capturing operation and the second screen related to the adjusting operation related to the storage space (e.g., starting the software management, the photo album program or the combination thereof on the second screen) through the display screen 130. In other words, a screen presented by the display screen 130 includes both the first and second screens at the same time. In addition to the screen having related software for the image capturing operation, the software management program related to the adjusting operation on the storage space or the photo album program will also be presented. As such, not only is the process of the image capturing operation uninterrupted, the user is also able to delete file or uninstall software accordingly. It should be noted that, the program started in this step may be predetermined or may additionally present a program selecting option for the user to select, but the program needs to at least provide functions for deleting files or uninstalling software in principle.

Figure 4B:
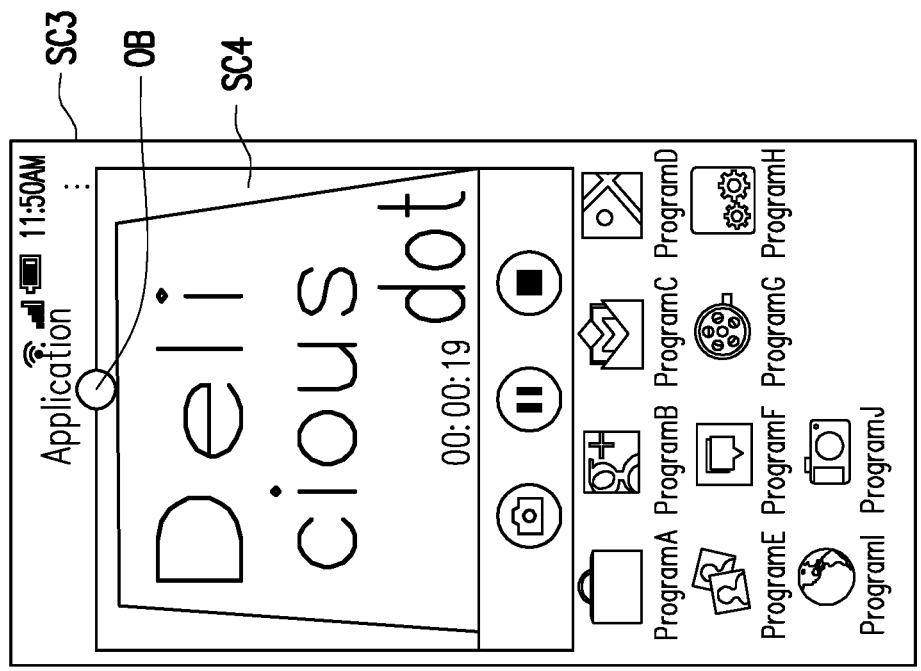
FIG. 4A and FIG. 4B are examples illustrating a picture-in-picture mode.
Figure 4A:
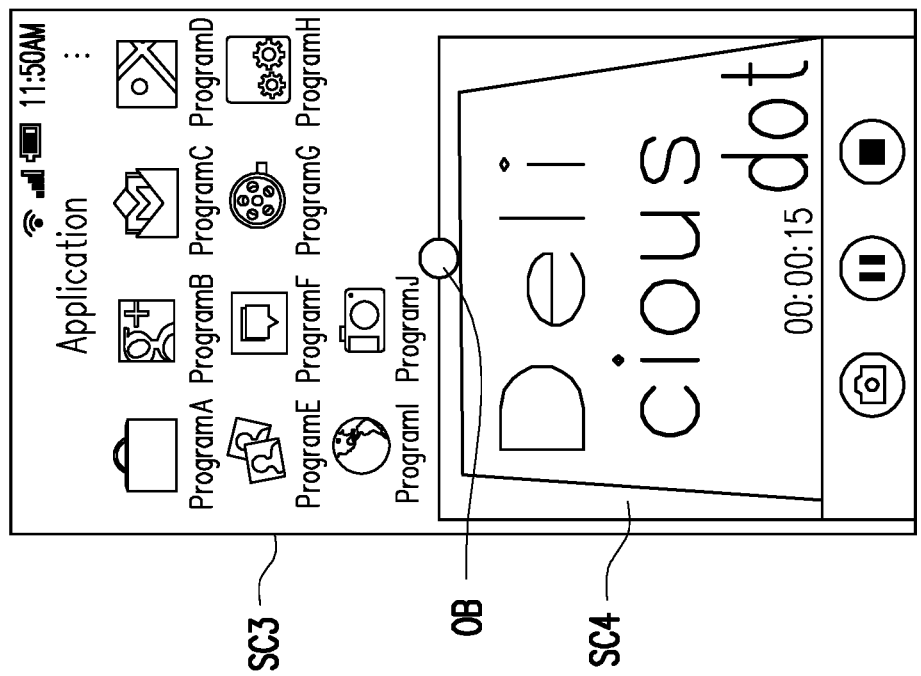

There are various ways for presenting the two screens. For instance, the following description refers to FIG. 4A and FIG. 4B, which are examples of presenting the first and second screens by a picture-in-picture (PIP) mode. The picture-in-picture mode means that one screen is presented by a full screen while another screen is presented by a smaller window screen. A screen SC3 is a desktop launcher program, which can allow the user to directly uninstall a software program corresponding to an icon on the screen. A screen SC4 is the shooting program. Referring to FIGS. 3A and 4A together, the processor 150 scales down a full screen (the screen SC1 of FIG. 3A) presenting the image capturing operation (the shooting program, for example) to a size of the screen SC4 through the display screen 130 so the screen SC3 of the desktop launcher program can be presented. Moreover, referring to FIGS. 4A and 4B together, the display screen 130 further presents a virtual operation button OB. In response to a dragging operation on the operation button OB detected by the input unit 140, the processor 150 correspondingly drags the screen SC4 through the display screen 130 so the user can adjust a position of the shooting program based on demand. In other words, the screen SC4 is presented by a floating window. It should be noted that, in other examples, the screen SC3 may present the shooting program, and the screen SC4 may present the desktop launcher program. Also, a size, a shape or a position of the operation button OB may also be changed.

Figure 5:
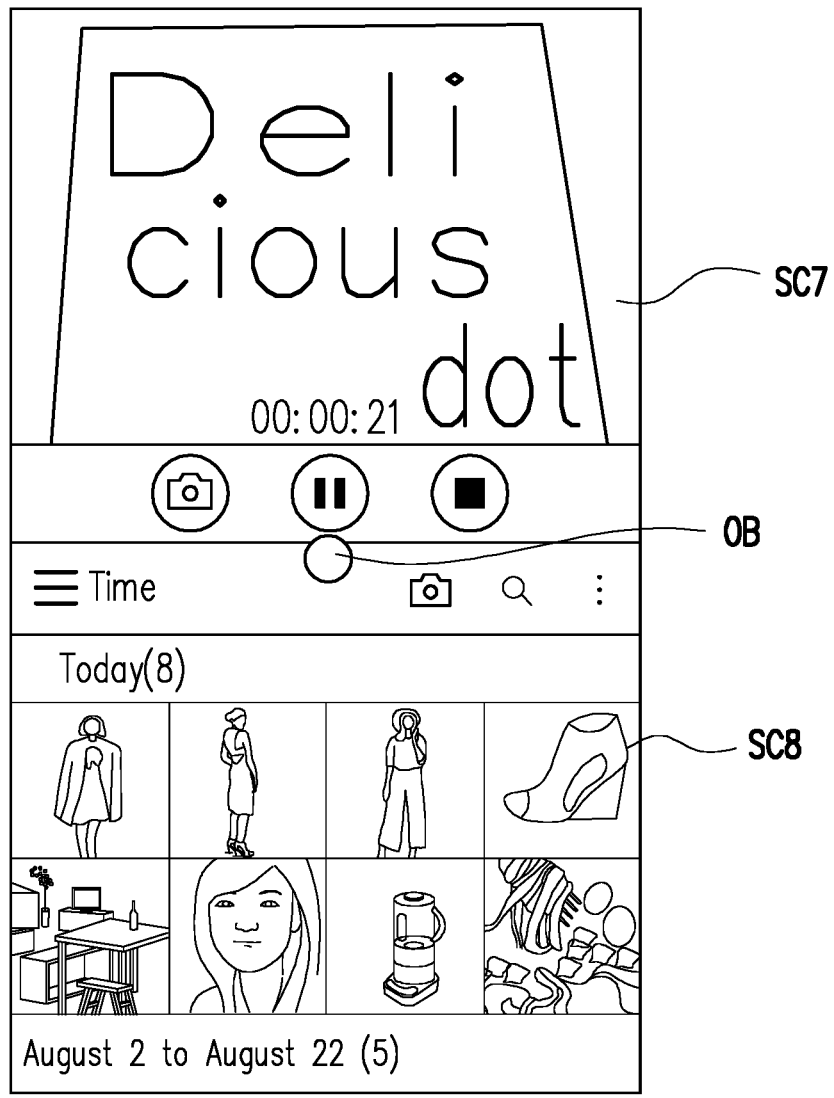
FIG. 5 is an example illustrating a split screen mode.

In addition, the following description refers to FIG. 5, which is an example of presenting the first and second screens by a split screen mode. Unlike the PIP mode, a screen SC7 of the shooting program and a screen SC8 of the photo album program have the full screen presented by the display screen 130 divided in half Further, in response to the dragging operation on the operation button OB, the processor 150 correspondingly scales up or scales down the screen SC7 through the display screen 130 so the user can adjust a screen size of the shooting program based on demand (e.g., the screen SC7 may be scaled down by dragging the operation button OB upwardly and the screen SC8 may be scaled down by dragging operation button OB downwardly).

Figure 6A:
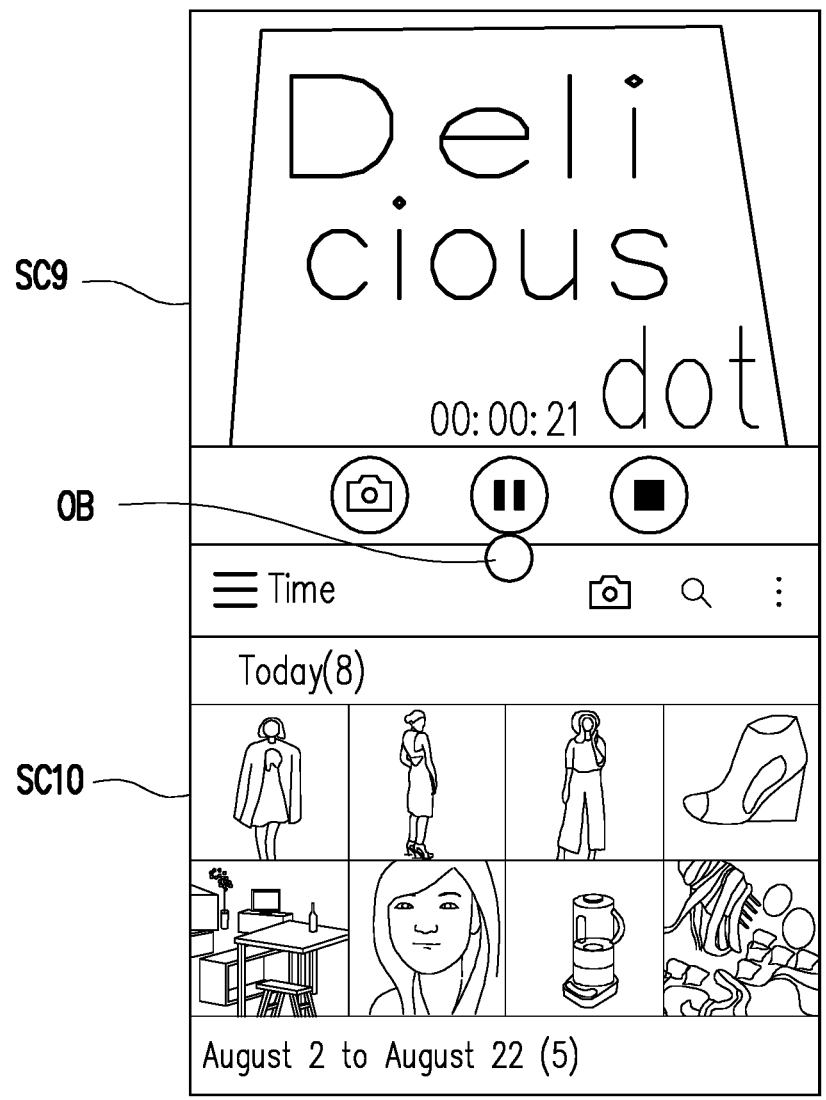
FIG. 6A to FIG. 6C are examples illustrating a screen adjustment of a photo album program.
Figure 6B:
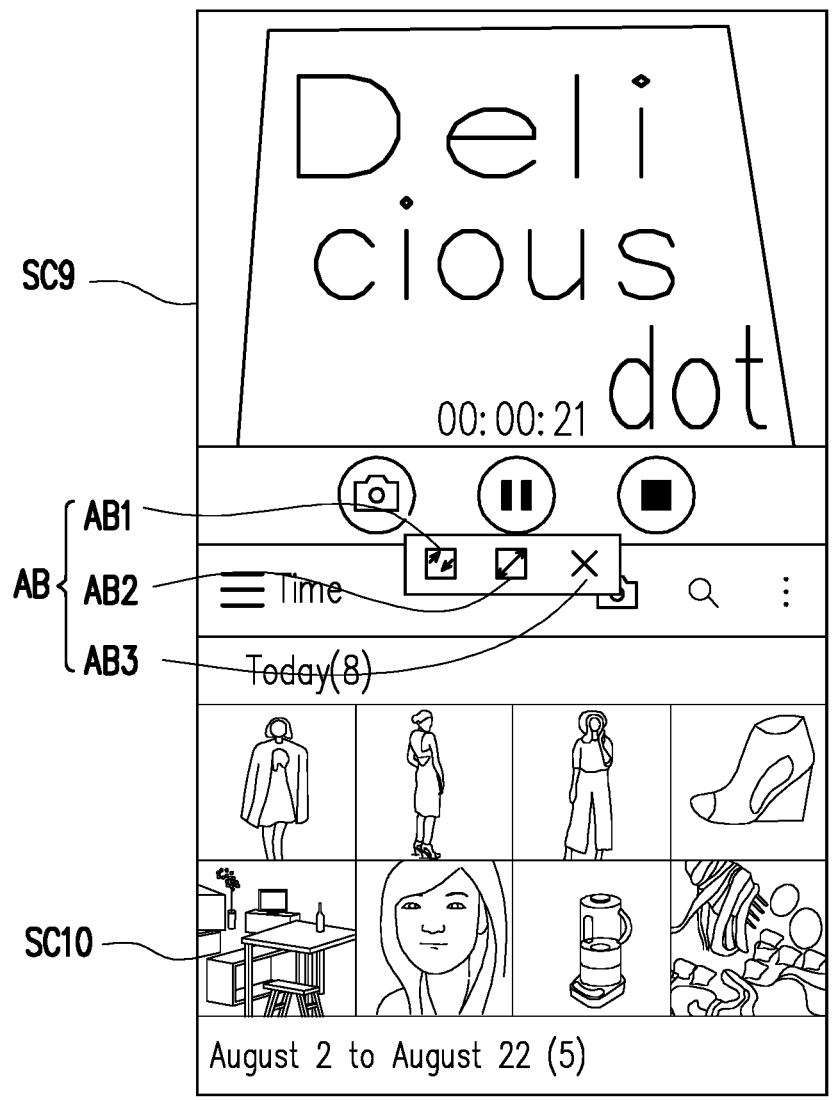
Figure 6C:
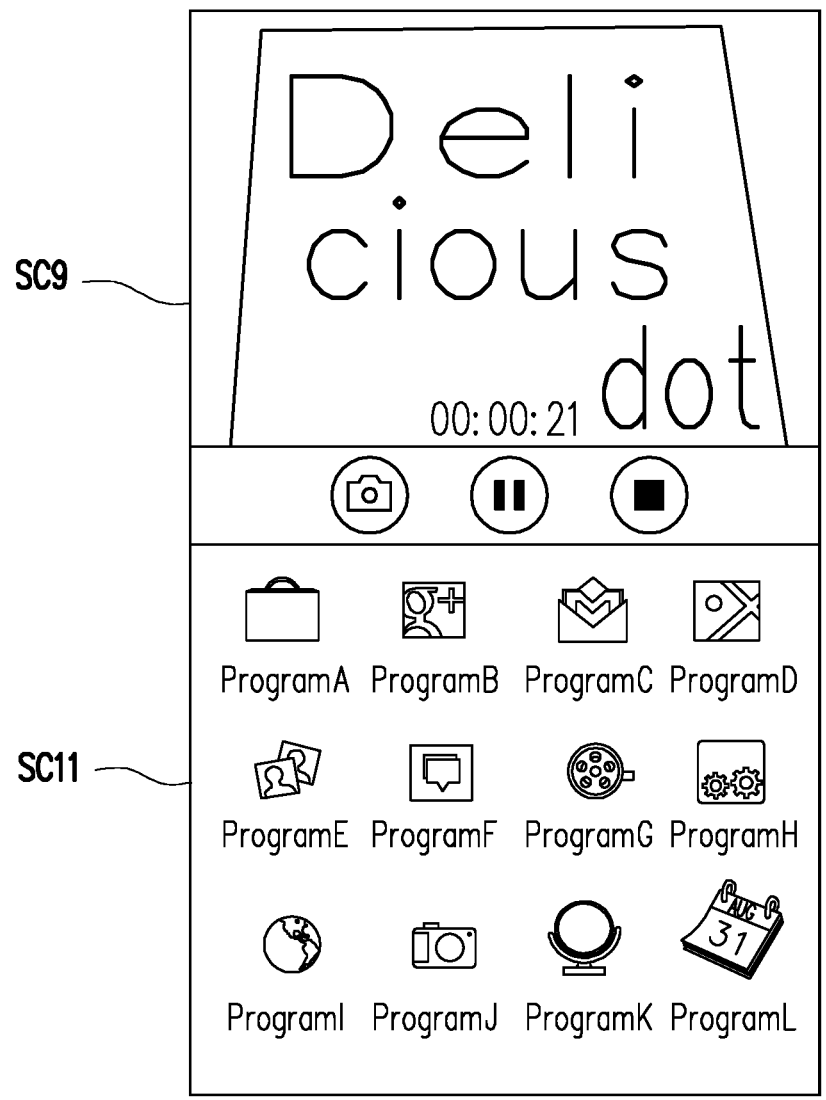

Other than adjusting the position or the size of the screen through the dragging operation, in response to the selecting operation on the first screen related to the image capturing operation or the second screen related to the adjusting operation (e.g., by tapping on the screen, pressing a specific button, etc.), the processor 150 presents a window adjusting option on a selected screen corresponding to the selecting operation through the display screen 130 for the adjusting operation, which may be used to close, scale up and scale down the selected screen. The following description refers to FIGS. 6A to 6C, which are examples illustrating a screen adjustment of a photo album program. It is assumed that the selecting operation corresponding to the photo album program is detected by the input unit 140 so the display screen 130 presents the virtual operation button OB on an upper edge of a screen SC10 of the photo album program (as shown by FIG. 6A). Next, in response to the tapping operation on the operation button OB, the processor 150 presents a window adjusting option AB including minimizing window, maximizing window and closing window options AB1, AB2 and AB3 through the display screen 130 (as shown by FIG. 6B). In response to an operation on the minimizing window option AB1, a screen SC9 is scaled up to the full screen; in response to an operation on the maximizing window option AB2, the screen SC10 is scaled up to the full screen; and in response to an operation on the closing window option AB3, the photo album program is closed and a screen SC11 of the desktop launcher program is presented by the display screen 130 (as shown by FIG. 6C). It should be noted that, in other examples, in response to the photo album program or the software management program being closed, the processor 150 may also present the first screen related to the image capturing operation by the full screen (e.g., the screen SC9 in FIG. 6C being scaled up to the full screen).

Figure 7A:
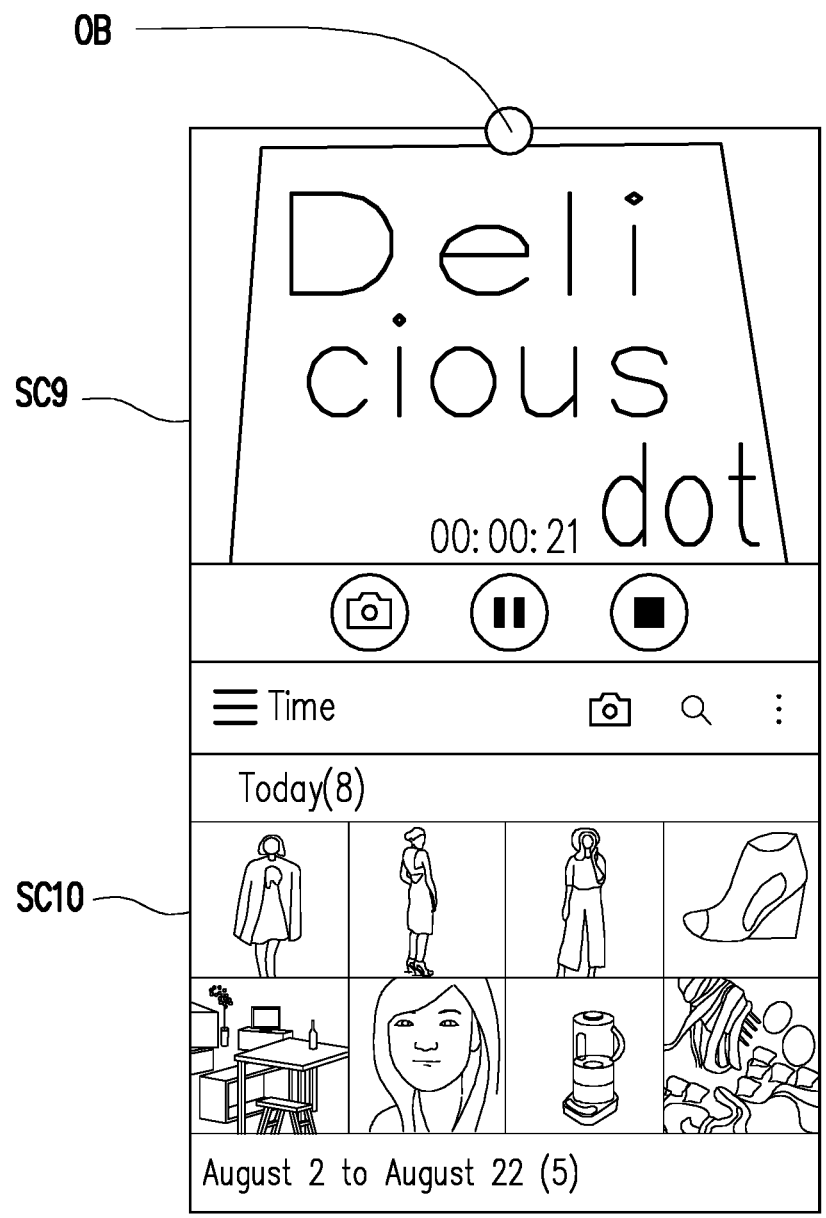
FIG. 7A to FIG.7C are examples illustrating a screen adjustment of a shooting program.
Figure 7B:
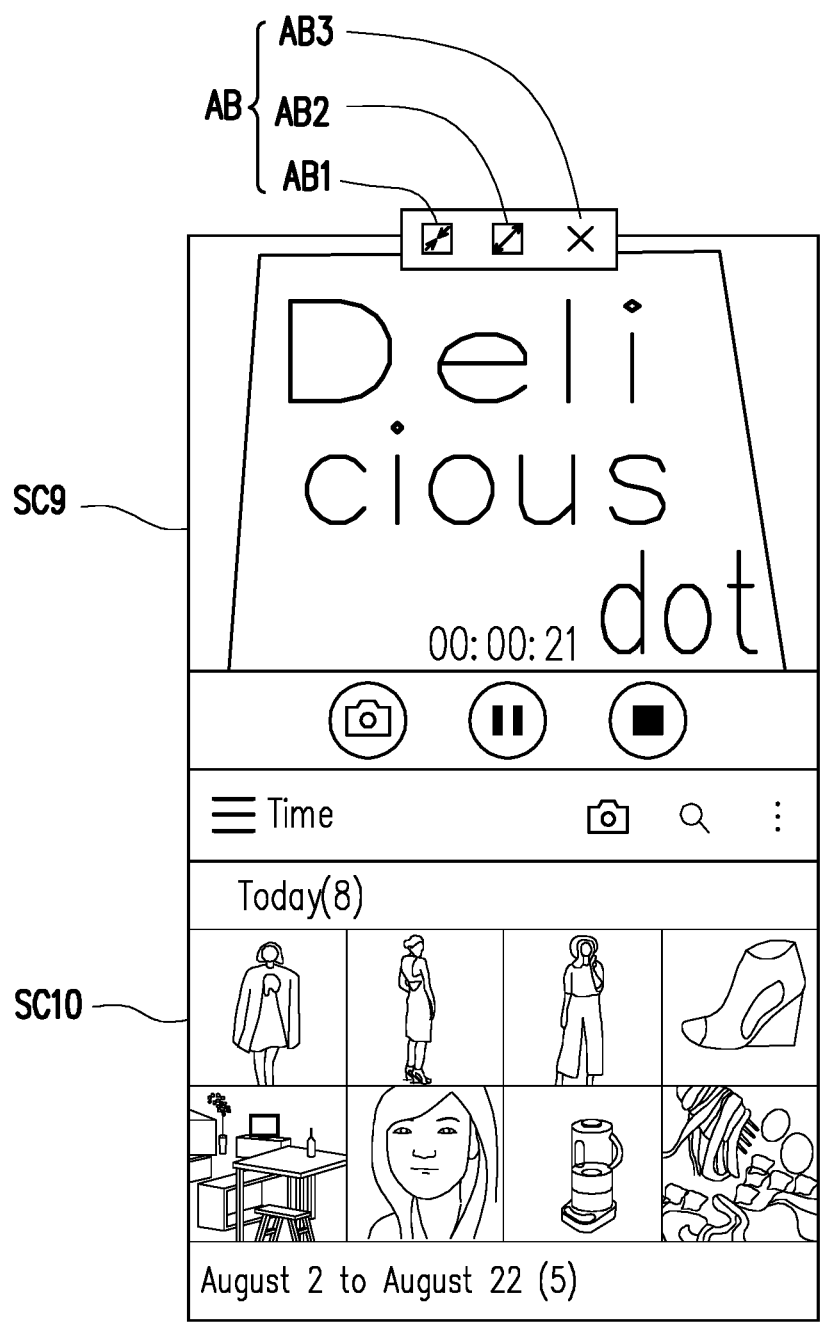
Figure 7C:
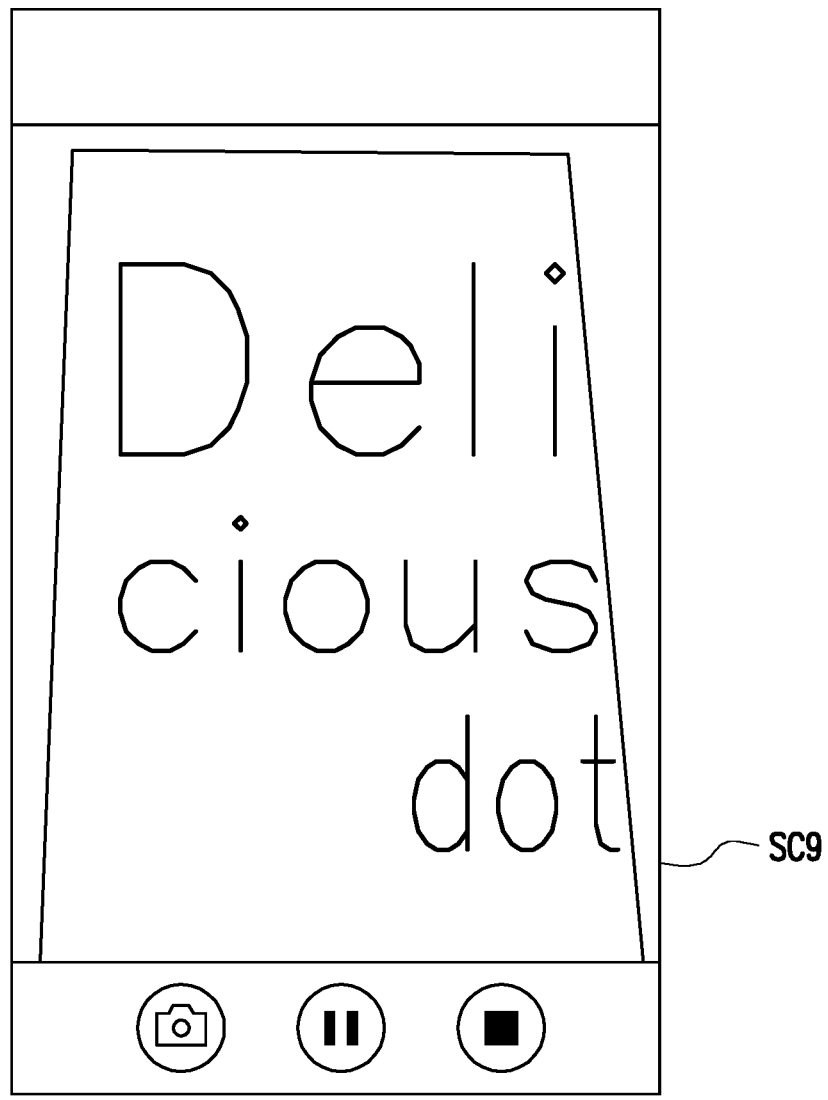

In addition, the following description refers to FIGS. 7A to 7C, which are examples illustrating a screen adjustment of a shooting program. It is assumed that the selecting operation corresponding to the shooting program is detected by the input unit 140 so the display screen 130 presents the virtual operation button OB on an upper edge of the screen SC9 of the shooting program (as shown by FIG. 7A). Next, in response to the tapping operation on the operation button OB, the processor 150 presents a window adjusting option AB including minimizing window, maximizing window and closing window options AB1, AB2 and AB3 through the display screen 130 (as shown by FIG. 7B). In response to an operation on the minimizing window option AB1, a screen SC10 is scaled up to the full screen; in response to an operation on the maximizing window option AB2, the screen SC9 is scaled up to the full screen (as shown by FIG. 7C); and in response to an operation on the closing window option AB3, the shooting program is closed, and the screen of the desktop launcher program is presented by the display screen 130 or the screen SC10 is scaled up to the full screen. It should be noted that, in other examples, the window adjusting option AB may include only the closing window option AB3, a combination with one of the other two options or other options (e.g., options like moving window, centering window, etc.), and their sizes, positions and shapes may be different.

Thus, other than simultaneously providing the two screens so the process of the image capturing operation can continue to operate normally, the embodiment of the disclosure can also start the programs related to the adjusting operation on the space for the user to free the space. The two screens may be flexibly adjusted in terms of the size and the position or even closed, so as to improve user experience. Further, compared with the two screens being provided, in other embodiments, the display screen 130 may also display the programs related to the adjusting operation on the storage space by the full screen (providing only one single screen) while recording continually (in background execution) such that the process of the image capturing operation may still be maintained.

In the foregoing embodiments and examples, the space adjusting option presented in step S220 is related to adjusting on the storage space. Nonetheless, if the selecting operation is related to not adjusting on the storage space, the image capturing operation is only ended (e.g., closing the shooting program or the recording program or stopping shooting, etc.) when the storage space runs out (to be less than 5, 20, 50 MB, etc.) in the embodiments of the disclosure. In other words, even if the adjusting operation on the storage space is not selected, the shooting or the recording will still continue without being interrupted. Further, in the embodiments of the disclosure, because the user is prompted to free the storage space through the space adjusting option, the processor 150 only needs to determine whether an operation for stopping the process of the image capturing operation (e.g. stopping shooting or stopping capturing the panorama image) or an operation for correspondingly closing the shooting program or the recording program is received through the input unit 140. Moreover, the prompt of the space adjusting option may be closed, displayed on a notice bar or scaled down into the floating window to avoid interference with the shooting or recording programs. If said operation for ending the image capturing operation is not received, the processor 150 may directly stop the image capturing operation when the storage space runs out, so as to prevent other abnormal conditions from happening on the system; otherwise, the processor 150 stops the image capturing operation according to the received closing or stopping operations.

Furthermore, the disclosure additionally provides a non-transitory computer-readable recording medium (e.g., including storage media like a hard disk, an optical disk, a flash memory, Solid State Disk (SSD), etc.). Said non-transitory computer-readable recording medium can store a plurality of program code segments (program code segments for detecting the storage space, program code segments for presenting the space adjusting option, program code segments for maintaining the process and program code segments for presenting the screens), and the steps of the storage space adjusting method may be completed after loading these program code segments into the processor 150 of the image capturing apparatus 100 for execution.

In summary, the remaining space is continuously detected during the process of the shooting program or the recording program in the embodiments of the disclosure, and a warning is provided through the space adjusting option when the storage space is insufficient. In response to the selection on the warning of the space adjusting option, the photo album program or the software management program may be started for the user to uninstall software or delete files, or the shooting or the recording may be stopped when the space runs out without immediately interrupting the image capturing operation. In addition, the two screens related to the image capturing operation and adjusting operation on the storage space may have their sizes or positions adjusted or may even be closed so the use experience can be improved for the user in a more flexible presenting manner.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A storage space adjusting method, adapted to an image capturing apparatus having a display screen, the storage space adjusting method comprising:
   detecting a size of a storage space of the image capturing apparatus during an image capturing operation of the image capturing apparatus;
   presenting a space adjusting option for an adjusting operation on the storage space through the display screen in response to the storage space being insufficient; and
   maintaining a process of the image capturing operation in response to a selecting operation of the space adjusting option, comprising:
      simultaneously presenting a first screen related to the image capturing operation and a second screen related to the adjusting operation through the display screen if the selecting operation is related to adjusting on the storage space.

2. The storage space adjusting method of claim 1, wherein the step of maintaining the process of the image capturing operation in response to the selecting operation of the space adjusting option comprises:
   ending the image capturing operation when the storage space runs out if the selecting operation is related to not adjusting on the storage space.

3. The storage space adjusting method of claim 1, wherein the step of presenting the first screen related to the image capturing operation comprises:
   scaling down a full screen for presenting the image capturing operation to a size of the first screen.

4. The storage space adjusting method of claim 1, wherein the step of simultaneously presenting the first screen related to the image capturing operation and the second screen related to the adjusting operation through the display screen comprises:
   presenting the first screen and the second screen by a split screen mode.

5. The storage space adjusting method of claim 1, wherein the step of simultaneously presenting the first screen related to the image capturing operation and the second screen related to the adjusting operation through the display screen comprises:
   presenting the first screen and the second screen by a picture-in-picture mode.

6. The storage space adjusting method of claim 1, wherein the step of presenting the second screen related to the adjusting operation of the storage space comprises:
   starting a software management program, a photo album program or a combination thereof on the second screen.

7. The storage space adjusting method of claim 6, wherein the step of starting the software management program, the photo album program or the combination thereof on the second screen comprises:
   presenting a screen of a desktop launcher program on the second screen or presenting the first screen by a full screen in response to the software management program or the photo album program being closed.

8. The storage space adjusting method of claim 1, wherein after the step of simultaneously presenting the first screen related to the image capturing operation and the second screen related to the adjusting operation through the display screen, the storage space adjusting method further comprises:
   presenting a window adjusting option on a selected screen corresponding to the selecting operation for adjusting the selected screen in response to the selecting operation on the first screen or the second screen, wherein the window adjusting option comprises options for minimizing window, maximizing window and closing window.

9. The storage space adjusting method of claim 1, wherein after the step of simultaneously presenting the first screen related to the image capturing operation and the second screen related to the adjusting operation through the display screen, the storage space adjusting method further comprises:
   presenting an operation button on the first screen; and
   correspondingly dragging the first screen in response to a dragging operation on the operation button.

10. The storage space adjusting method of claim 1, wherein the step of detecting the size of the storage space of the image capturing apparatus comprises:
    using a remaining space or a space available for recording a video with a specific time length as a reference for determining the storage space being insufficient.

11. An image capturing apparatus, comprising:
    an image capturing unit for capturing at least one image;
    a memory, having a store space for storing the at least one image;
    a display screen for presenting at least one screen; and
    a processor, coupled to the image capturing unit, the memory and the display screen, wherein the processor detects a size of the storage space during an image capturing operation of the image capturing unit, the processor presents a space adjusting option for an adjusting operation on the storage space through the display screen in response to the storage space being insufficient, and the processor maintains a process of the image capturing operation in response to a selecting operation of the space adjusting option, wherein
    the processor simultaneously presents a first screen related to the image capturing operation and a second screen related to the adjusting operation through the display screen if the selecting operation is related to adjusting on the storage space.

12. The image capturing apparatus of claim 11, wherein the processor ends the image capturing operation when the storage space runs out if the selecting operation is related to not adjusting on the storage space.

13. The image capturing apparatus of claim 11, wherein the processor scales down a full screen for presenting the image capturing operation to a size of the first screen through the display screen.

14. The image capturing apparatus of claim 1, wherein the processor presents the first screen and the second screen by a split screen mode through the display screen.

15. The image capturing apparatus of claim 11, wherein the processor presents the first screen and the second screen by a picture-in-picture mode through the display screen.

16. The image capturing apparatus of claim 11, wherein the processor starts a software management program, a photo album program or a combination thereof to be displayed on the second screen through the display screen.

17. The image capturing apparatus of claim 16, wherein the processor presents a screen of a desktop launcher program on the second screen or presents the first screen by a full screen through the display screen in response to the software management program or the photo album program being closed.

18. The image capturing apparatus of claim 11, wherein the processor presents a window adjusting option on a selected screen corresponding to the selecting operation for adjusting the selected screen through the display screen in response to the selecting operation on the first screen or the second screen, wherein the window adjusting option comprises options for minimizing window, maximizing window and closing window.

19. The image capturing apparatus of claim 11, wherein the processor presents an operation button on the first screen through the display screen, and correspondingly drags the first screen in response to a dragging operation on the operation button.

20. A non-transitory computer-readable recording medium for recording a program code configured to be loaded by a processor of an image capturing apparatus to execute steps of:
  detecting a size of a storage space of the image capturing apparatus during an image capturing operation of the image capturing apparatus;
  presenting a space adjusting option for an adjusting operation on the storage space through a display screen in response to the storage space being insufficient; and
  maintaining a process of the image capturing operation in response to a selecting operation of the space adjusting option, comprising:
  simultaneously presenting a first screen related to the image capturing operation and a second screen related to the adjusting operation through the display screen if the selecting operation is related to adjusting on the storage space.

* * * * *